US006665811B1

(12) United States Patent
de Azevedo et al.

(10) Patent No.: US 6,665,811 B1
(45) Date of Patent: Dec. 16, 2003

(54) METHOD AND APPARATUS FOR CHECKING COMMUNICATIVE CONNECTIVITY BETWEEN PROCESSOR UNITS OF A DISTRIBUTED SYSTEM

(75) Inventors: Marcelo Moraes de Azevedo, Cupertino, CA (US); Robert L. Jardine, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 622 days.

(21) Appl. No.: 09/645,477

(22) Filed: Aug. 24, 2000

(51) Int. Cl.[7] .................................................. G06F 11/00
(52) U.S. Cl. ............................................. 714/4; 714/43
(58) Field of Search ......................................... 714/4, 43

(56) References Cited

U.S. PATENT DOCUMENTS

| 5,687,308 A | * | 11/1997 | Jardine et al. | 714/4 |
| 5,884,018 A | * | 3/1999 | Jardine et al. | 714/4 |
| 5,907,670 A | * | 5/1999 | Lee | 714/4 |
| 5,996,086 A | * | 11/1999 | Delaney et al. | 714/4 |

OTHER PUBLICATIONS

"Providing Backup and Non–Disclosure Recovery of Local Area Network traffic Across a Connnection Oriented Wide Area Network "IBM TDB Jun. 1997, vol. 40 issue 6, ppg 20–203.*

* cited by examiner

Primary Examiner—Robert Beausoliel
Assistant Examiner—Bryce P. Bonzo

(57) ABSTRACT

An apparatus and protocol to determine the group of processors that will survive communications faults and/or timed-event failures in a distributed multiprocessor or clustered system. The processors are coupled to one another by an inter-processor communication network that is used, inter alia, by each processor to send path probe messages to each of the other processor units on all available network paths. A processor is suspected of being communicatively isolated, or having ceased operations, when one or more of the other processors detects the absence of an acknowledgment response from the processor. When this happens, all of the processors are subjected to a series of stages in which they repeatedly broadcast their status and connectivity to each other.

39 Claims, 3 Drawing Sheets

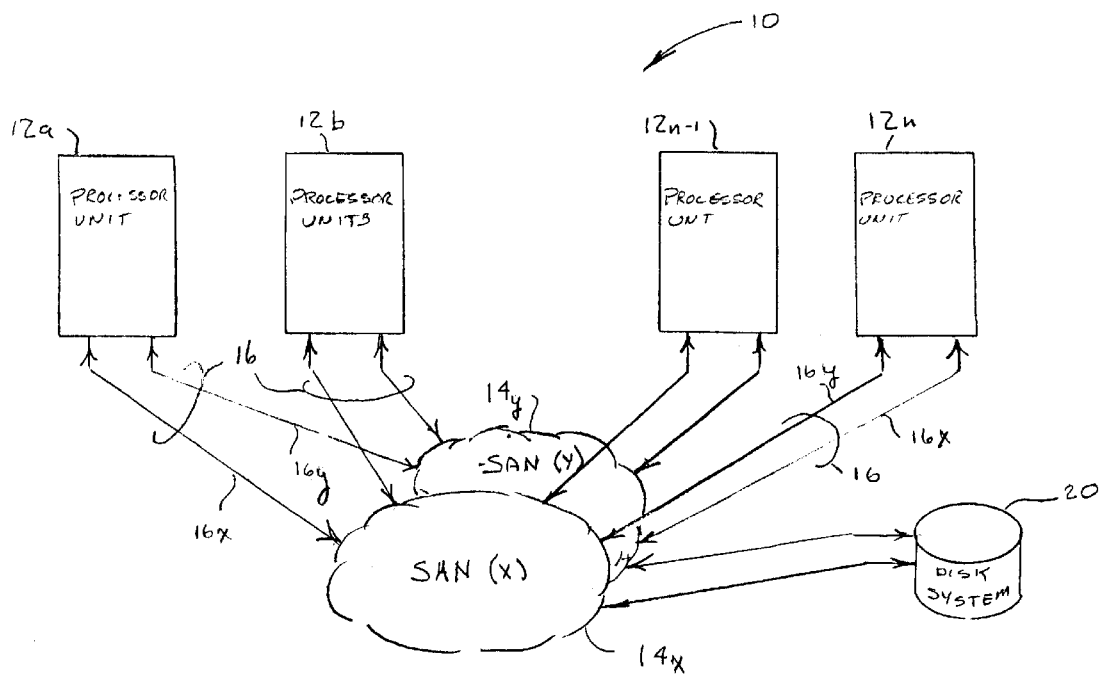
FIG_1
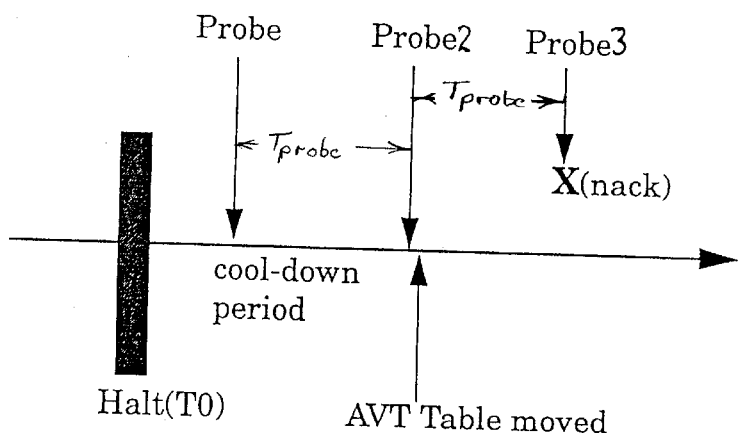
FIG_3

METHOD AND APPARATUS FOR CHECKING COMMUNICATIVE CONNECTIVITY BETWEEN PROCESSOR UNITS OF A DISTRIBUTED SYSTEM

CROSS-REFERENCES TO RELATED APPLICATIONS

STATEMENT AS TO RIGHTS TO INVENTIONS MADE UNDER FEDERALLY SPONSORED RESEARCH AND DEVELOPMENT

BACKGROUND OF THE INVENTION

This invention relates generally to fault-tolerant distributed or clustered multiprocessor systems. More particularly, the invention relates to methods, and apparatus implementing those methods, for improving the resilience of a multiprocessor system in partial and total communication failure scenarios, and in the face of failure of periodic or timed events on a constituent processor. Thereby, system fault tolerance is improved.

One inventive method of achieving fault-tolerant capability in distributed multiprocessor architectures is to detect processor failures quickly with an "I'mAlive" protocol (described in U.S. Pat. No. 4,817,091). Briefly, the I'mAlive protocol involves each processor of the system periodically sending or otherwise broadcasting I'mAlive message packets to each of the other processors in the system. Each processor determines whether another processor is operational by timing I'mAlive packets from it. When a processor sees that the time interval passes without receipt of an I'mAlive packet from a given processor, the first processor decides that the silent processor might have failed.

The I'mAlive protocol message scheme is often combined with a "process pair" mechanism, comprising a primary process installed and running on one processor of the multiple processor system with a copy of that process operating as a backup process on another processor of the system. Periodic updates are sent from the primary process to the backup process so that should the primary process, or the processor it runs on, fail, the backup can take over for the primary process with minimal interruption. An example of the use of process pairs can be found in the above-identified '091 patent.

Unfortunately, there are situations in which a processor will be late in broadcasting its required I'mAlive message, in turn causing one or more of the other processors to assume that the tardy processor has failed. These situations, in turn, can give rise to such actions (to name a few) as: (1) both of the processes of a process pair (running on different processors) regarding themselves as the primary, destroying the ability to perform backup functions and possibly corrupting files; or (2) all system processors becoming trapped in infinite loops, contending for common resources; or (3) corrupting various system tables. Although such situations are rare, they are possible and have been observed in systems developed prior to implementation of a "Regroup" technique (described below). For fault tolerant systems, such situations must be made practically non-existent.

To supplement the I'mAlive protocol, and to avoid the problems referred to above, a technique referred to as "Regroup" was developed. Triggered when a processor fails to see an I'mAlive message within a prescribed check period, Regroup begins with messages being exchanged between all processors of the system in order to enlist them in the Regroup operation. Regroup then employs a consensus algorithm to determine the true state of each processor in the system by having each volunteer its record of the state of all other processors. Each processor compares its own record with records from other processors and updates its record accordingly. When the consensus is complete, all processors have the same record of the system's state. The processors will have coordinated among themselves to reintegrate functional but previously isolated processors and to correctly identify and isolate nonfunctional processors.

Later developments have refined the Regroup technique, allowing its use to determine membership even when physical communication among processors is lost. See, for example, U.S. Pat. No. 5,884,018 for "Method and Apparatus for Distributed Agreement on Processor Membership in a Multi-Processor System." To the extent necessary, said U.S. Pat. No. 5,884,018 is incorporated by reference as if fully set forth herein.

As indicated above, a missing or tardy I'mAlive message can cause each of the two processes of a process pair to operate as if it is the primary process. This, in turn, gives rise to the possibility of data corruption caused by both processors of the pair trying to write (and/or overwrite) portions of a disk drive (or other I/O controller) managed by the two processes. To avoid this situation, Regroup is structured to require each processor, at the start of a Regroup event, to invoke a "Hold I/O" state in which all input/output transmissions, except those necessary to the Regroup operation, are suspended. The Hold I/O state is turned off for those processors determined to be fit to continue operation. Any processor(s) determined to be faulty (either on its own, or by the Regroup operation) will continue the Hold I/O state until it halts. In addition, to preclude premature takeover of a process' operations by its backup process, the first stage of Regroup is "stalled" (i.e., extended) long enough to ensure that all processors have entered the Regroup operation and invoked the Hold I/O state. It has been determined that the stall period is at least two I'mAlive checking periods ($2T_{check}$), plus a safety margin to cover message transit time and to account for small differences in the processor clocks in the multiple processors of the system; one extra $T_{tick}$ more than covers these small effects. ($T_{tick}$, approximately 0.3 seconds, is a basic time unit in the I'mAlive messaging operation as well as the Regroup algorithm. In addition to its use in "pacing" the sending of I'mAlive messages every two $T_{tick}$ intervals and checking every four $T_{tick}$ intervals, the Regroup operation, when activated, proceeds in multiple rounds, the interval between which is $T_{tick}$. That is, when Regroup is active, on every $T_{tick}$ interval, every processor sends its Regroup messages to all other processors.)

The stall period described in the previous paragraph is known as stage 1 of the Regroup operation. Under certain special circumstances, a processor participating in a Regroup operation may determine that the duration of the stall period (or stage 1) must be extended beyond $2T_{check}+T_{tick}$. This is referred to as a "cautious mode" Regroup operation. While in cautious mode, the processor invokes Hold I/O and waits longer for stage 1 to complete. The situations leading to a processor entering cautious mode are:

1. The processor detects that two or more peer processors are missing in the current Regroup operation. Note that this situation is possible if the processor is isolated, or if the system is subject to multiple processor and/or communication path failures.
2. The Regroup operation is restarted due to processor or communication failures that occur during the Regroup operation itself.
3. The Regroup operation is started because the multiprocessor system is recovering from a power outage. Because the recovery speed of individual processor units may vary, processor units must wait longer in stage 1 of the Regroup operation.

The I'mAlive protocol is most often employed in a prioritized interrupt scheme in which the work done by the processor in order to construct and send I'mAlive messages is assigned a low priority level. Message construction allows the I'mAlive message to provide a fair indication of the state of well-being or health of the sending processor. It informs the other processors that the sending processor is capable of doing more than just sending I'mAlive messages. However, higher priority tasks can delay the I'mAlive interrupt, and the send of an I'mAlive message, long enough so that another of the processors of the system, failing to see the I'mAlive message within the requisite time, will initiate the Regroup operation. Regroup operations that are triggered by late sending of I'mAlive messages (as opposed to a processor failure or communications path failure) can be considered a "false alarm." Regroup will run, and discover no real problem. This may happen repeatedly, even frequently, under certain types of heavy processor loads such as a high rate of I/O interrupts requiring substantial processing. These false alarm Regroup operations not only use resources unnecessarily, they are somewhat risky in possibly halting a tardy but otherwise healthy processor, and they obscure diagnosis of what is really happening in the system. A candidate solution to this problem is to increase the frequency with which the I'mAlive messages are sent. However, there is an upper bound to increasing the frequency of I'mAlive message broadcasts where they begin to significantly impact upon the efficiency of processor operations.

Another candidate solution would be to decrease the frequency of I'mAlive checking (but not necessarily the frequency of sending). This would almost certainly decrease the probability of false alarm Regroup operations, but at the significant cost of increasing the failure detection latency and also extending the duration of the Hold I/O time period. A important goal of the present invention is to both decrease the failure detection latency and to reduce the duration of the Hold I/O (described below) period.

Thus, it can be seen that there exists a need to reduce both the time for detecting a problem and entering Regroup and the time needed for the Hold I/O state.

SUMMARY OF THE INVENTION

Broadly, the present invention supplements the I'mAlive method with periodic path probe messages that function to check all communicative paths (and, to some extent, the operability of the destination processor unit) between every processor unit of a distributed system and all other processor units of that system. Path probe messages are structured to be sent at greater frequencies than I'mAlive messages, resulting in quicker detection of problems and a much faster initiation of the Regroup operation. In addition, the present invention produces a significant reduction of the "stall" period for ensuring that all processor units have entered the Regroup operation and invoked the Hold I/O state.

The invention is preferably used in a multiprocessor system in which multiple processor units are communicatively intercoupled to form a clustered system. According to the invention, each of the processor units will periodically send to all other processor units, on all available interconnecting paths, a path probe message. All processor units will respond to receipt of all received path probe messages with an acknowledgment (ACK) or a negative acknowledgment (NACK). If a sending processor unit fails to receive an ACK from any of the processor units to which a path probe message was sent within a prescribed amount of time, or receives a NACK response, a Regroup operation will be initiated to determine processor unit membership in the system, and the connectivity of those processor units. According to one embodiment of the invention, every processor unit entering the Regroup operation will invoke a "Hold I/O" to suspend input/output activity (other than Regroup messages).

The Hold I/O ensures, in the case of a full disconnect between two different processors, that a takeover won't happen until it is guaranteed that both primary and backup processes of an I/O process pair won't both act as primary (owner) of a particular disk drive (or other I/O controller). All processor units will have the I/O transfers on hold, and will wait until the Regroup operation completes before resuming such transfers.

In another embodiment of the invention, processor units will not invoke Hold I/O upon entering the Regroup operation. Rather, when Regroup establishes that certain of the processor units, if any, must halt (e.g., because they no longer have the required connectivity for communicating with the other processor units of the system), those processor units will then invoke Hold I/O. Again, regroup operation is extended ("stalled") a predetermined amount of time to ensure that all halting processor units have invoked Hold I/O.

The present invention offers a number of advantages, which are achieved by both of its embodiments. First, since the path probe messages of the invention are used primarily to check the health of the communication between the sending processor unit and all other processor units of the distributed system, a higher priority interrupt handler can be used—assuming the processor unit has a prioritized interrupt structure permitting path probe messages to be sent with greater frequency to detect communication problems much quicker. In fact, the sending of path probe messages would preferably use an interrupt handler with a priority higher than that of other interrupt handlers in order to avoid having path probe transmissions potentially starved by other (higher priority) interrupt handlers.

Further, path probes are meant to primarily to check interprocessor communication by eliciting a response from the target processor unit. As such, path probe message construction can be minimal and, therefore, does not have the overhead of I'mAlive message transmission. Thus, path probe operation does not have more than a minimal impact on the performance of a processor unit.

The use of path probe transmissions can check the connectivity to a destination processor unit and the destination processor unit will not even know that it is being "probed." This is possible if proper hardware support is provided. The destination processor unit will not be interrupted by a path probe message. An ACK or a NACK will be returned by the hardware to the sender processor unit, depending upon the outcome of certain permission checks (described below) accomplished on the path probe message by the destination processor unit.

Further, in distinction to the I'mAlive method without the supplemental path probing taught in the present invention in which it is the receiver that is checking for a lack of I'mAlive messages, the present invention employs the sending processor unit to check for a timely response to transmitted path probe messages. There are expected latencies attendant with having a receiver of a message initiate time-based checking. In contrast, the present invention can significantly accelerate detection of a failed processor or communications path by using the message sender as the checking entity of the paths.

These and other advantages and features of the present invention will become apparent to those skilled in this art upon a reading of the following description of the invention which should be taken in conjunction with the accompanying drawings.

BRIEF DESCRIPTION OF THE DRAWINGS

FIG. 1 is a simplified block diagram of a multiprocessing system in which the processor units of the system are communicatively intercoupled for incorporating use of the present invention;

FIG. 3 is a time-line diagram illustrating the maximum time after a processor unit halt before a Regroup operation will start as a result of the methods of the present invention.

DESCRIPTION OF THE SPECIFIC EMBODIMENTS

Figure 2:
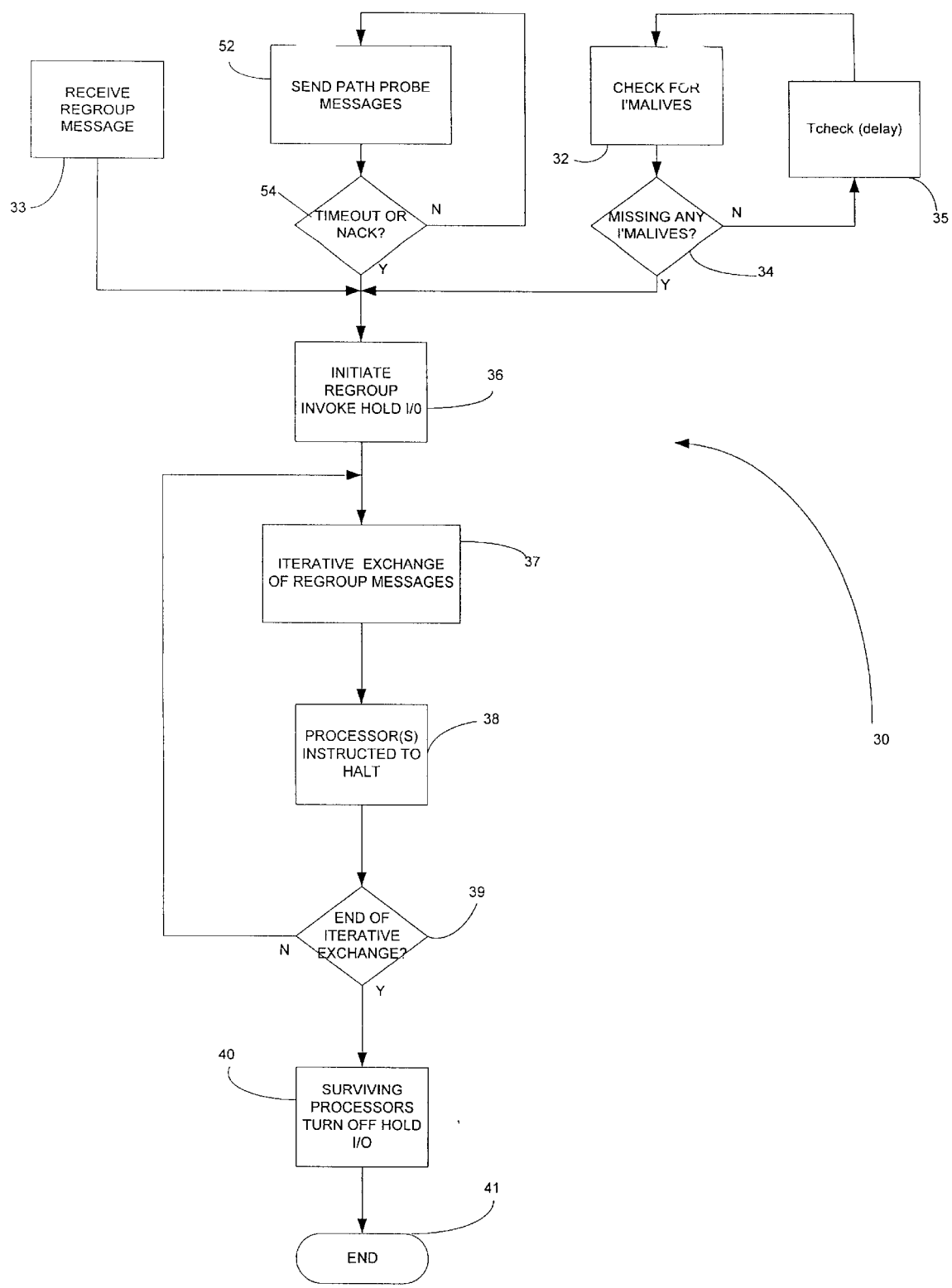
FIG. 2 is a flow diagram broadly illustrating the major steps taken to implement the "I'mAlive" method of fault-tolerant checking supplemented by an embodiment of the present invention.

Turning now to FIG. 1, there is illustrated a distributed processing system, designated generally with the reference numeral 10, comprising processor units 12a, 12b, ..., 12n. The actual number of processor units 12 could be anything more than one for effective use of the present invention, although the multiprocessor systems for which the present invention has been designed are often limited to sixteen processor units for reasons not relevant to the present invention. It will be evident to those skilled in this art, however, that the present invention does not limit the actual number of processor units that can be used.

The processing system 10 is preferably constructed to have an architecture similar to that taught in U.S. Pat. No. 5,751,932 (issued May 12, 1998; hereinafter, the '932 patent") and, therefore, to the extent necessary is incorporated herein by reference.

The processors 12 are interconnected by X and Y system area networks (SANs) 14 (14x, 14y) and connection links 16 (16x, 16y)that provide the processors 12 with interprocessor communication. The X and Y SANs 14, which may include routing apparatus (not shown) as described in the referenced '932 patent, are constructed to form a joint I/O system that provides each of the processors 12 with at least two communication paths for both interprocessor communication to each of the other processors 12, and to each of the various I/O units (e.g., printers, secondary storage, and the like)—here, represented generally by the disk system 20.

Each of the processor units 12 implements the I'mAlive protocol for fault tolerance and, as is typical, will employ a prioritized interrupt system in which the I'mAlive message sending is relegated to a low priority. Also, the processor units 12 will use software constructs to implement the Regroup operation described in referenced U.S. Pat. No. 5,884,018. Accordingly, each processor unit 12 sends an I'mAlive message to each of the other processor units 12 approximately every T seconds (e.g., 0.6 seconds or two $T_{tick}$ intervals), and checks for receipt of I'm live messages from the other processors 12 every 2T seconds (e.g., 1.2 seconds or one $T_{check}$ (four $T_{tick}$) intervals). When a check indicates missing messages from a processor unit, the checking processor will initiate the Regroup operation to determine what processor units 12 continue to operate, and which may have lost communicative connectivity with the majority of the operating processor units. For a more complete description of this process, see the referenced U.S. Pat. No. 5,884,018.

Initiation of a Regroup operation by a processor unit 12 will include transmission of Regroup messages by that processor unit to the other processor units 12, causing them to also enter the Regroup operation.

One way to check the communication paths between the processors 12 is to use the I'mAlive method of fault-tolerant checking. FIG. 2 illustrates, in part, the I'mAlive technique at steps 32, 34, 35 of the flow diagram 30. Typically, I'mAlive messages are sent by a processor unit 12 with a frequency twice that of the checking frequency. So, for every two I'mAlive messages sent, each processor unit will initiate a check (at step 32) to see if it has received I'mAlive messages from itself and its siblings. If an I'mAlive message has been received from every processor, the processor unit 12 will do nothing and will return to step 32 after a delay of duration $T_{check}$, expressly indicated at 35 ($T_{check}$ is the interval between two consecutive checks for I'mAlive messages performed by the processor unit 12). If, on the other hand, an I'mAlive message has not been received from every processor since the last check (step 34), the processor unit 12 will proceed to step 36 to initiate a Regroup operation—the steps of which (steps 36–40) are also shown in FIG. 2.

Note, as FIG. 2 illustrates, that the steps (36–40) of Regroup may also be entered by receiving (step 33) a Regroup message sent by a processor unit 12 that reached step 37 of the Regroup operation.

When a processor unit 12 enters Regroup, it will invoke a "Hold I/O" procedure in which all outgoing input/output (I/O) traffic is suspended except for those messages required for the Regroup operation. The processor unit 12 will then begin distributing Regroup messages to the other processor units to alert them that Regroup has been initiated and provide all processors entering Regroup with a view of the system 10 according to the processor unit(s) from which Regroup messages are received. Thus, step 37 sees an iterative exchange of Regroup messages in a series of steps (not shown) amongst the processor units 12 of the system 10, to ultimately construct a view of the system, including processor unit membership in the system. That view may or may not be the same as the view held by the processor units before Regroup was entered. If a processor unit 12 has failed, and has not yet come back on line, the system view will, of course, be different by that one processor unit whose membership is no longer included. Also, certain processor units may be found, during the Regroup operation, to no longer have direct communication with other processor units of the system. These processor units will, at step 38, be told to halt, excluding them from the system. (See the referenced U.S. Pat. No. 5,884,018 for further details on this aspect of Regroup operation.)

The iterative exchange (steps 37–39) will last a predetermined number of iterations, although it could be extended (in the case of a cautious mode Regroup operation), at the end of which the surviving processors will turn off Hold I/O (step 40). The operation will end at step 41 with the failed processor units, or processor units that are unable to otherwise participate in the Regroup operation, ostracized from system membership.

The I'mAlive method, therefore, provides the processors 12 with a way to ensure that all have at least one communication path to all the other processor units 12 of the system 10. For example, should the processor 12a (FIG. 1) lose both links 16 (16x, 16y), the I'mAlive messages it sends will no longer be received by the other processors 12 (12b, . . . 12n-1, 12n). The processor unit 12a will also not receive I'mAlive messages from those other processor units 12. Thus, the processor units 12 will initiate a Regroup operation. The processor unit 12a will discover that it is isolated from the other processor units 12 of the system 10 and will halt operation. The remaining processor units 12 (12b, . . . 12n) will establish a new membership view for the system 10 that excludes processor unit 12a and proceed.

There still remains the problem of a tardy processor unit, i.e., one that is delayed by higher priority tasks, from issuing its I'mAlive broadcast on time, causing the other processor units 12 to initiate a Regroup operation. The tardy processor unit will participate in the Regroup, and Regroup will end with the same complement of processor units (unless one has actually failed or lost communication with the others). As indicated above, such false alarms can not only unnecessarily use system resources, but create a risk of halting an otherwise healthy processor.

The present invention is provided to overcome this problem, and additionally provides a way to verify the communication paths between the processor units 12 in a manner that does not unduly burden the efficiency of the processor units 12. The invention is limited to checking communication paths, and the major steps (52, 54) of the invention are also illustrated in the flow diagram 30 of FIG. 2. The invention uses path probe messages which have a major distinction from the I'mAlive operation: it is the path probe message sender that is responsible for checking for a response to a message sent to a destination—as opposed to the intended receiver of an I'mAlive message.

Regroup can also be entered according to the present invention, when in addition to the two ways of entering a Regroup operation discussed above (from either of steps 33 or 34), a processor unit 12 fails to receive at least one of the expected responses to path probe messages it sent. As mentioned, each of the processor units 12 will periodically send path probe messages on all communication paths available from it to all other processor units 12 (step 52, FIG. 2). The path probe messages are very short, requiring only an acknowledgment (ACK) from the destination of the message. Also, path probe messages are assigned, in the interrupt hierarchy, a higher priority than that used for I'mAlive messaging. With the transmission of each path probe message, a timer is set. If, as step 54 illustrates, the sender processor unit 12 fails to receive the required acknowledgment (ACK) from the destination of any path probe message it sent, the timer will timeout to issue an interrupt to that processor unit, alerting it to the possibility of a bad communication path. Alternatively, the destination of the path probe message may return a negative acknowledgment (NACK) which initiates the same interrupt as the timeout. The processor unit 12a, when it takes this interrupt, will move from step 54 to the Regroup operation of steps 36–40. Receipt of an ACK from every target of a path probe message (and absence of a NACK; see below) will return the operation to step 52.

Note that path probe messages between processor units 12 use all available paths. That is, since each processor unit 12 has at least two paths provided by the links 16x and 16y and the corresponding SANs 14x and 14y, a path probe message transmitted on both paths could produce different results. If a NACK is received on either of the connection links 16, a Regroup operation will be triggered. However, a timeout on both connection links (in response to path probe messages sent to a particular destination processor unit) is needed to trigger a Regroup operation. A time-out on one connection link and an ACK on the other, in response to path probe messages sent to the same destination processor unit, will preferably not produce a Regroup operation.

Prior systems employing the I'mAlive method in a distributed architecture have lacked the ability to quickly detect such occurrences as a processor unit halt or a loss of a communication path between one of the processor units and any other. Certainly, such occurrences would ultimately be detected, but checks for missing I'mAlive transmissions were typically made approximately every 1.2 seconds. If a processor unit halts, or is otherwise disconnected from the system, a sibling processor unit sending I'mAlive messages would not know until it checked and found that it had not received an I'mAlive message from the affected processor unit.

The present invention preferably has the sending processor unit expecting some response to each path probe message within some predetermined period of time. Preferably, the architecture of each of the processor units 12 will include hardware (e.g., state machines and associated logic—not shown) that will respond to received path probe messages with the ACK and NACK replies, taking the burden off the heart of the processor unit 12 (e.g., typically a microprocessor). In addition, the processor units preferably also use the access validation and translation table (AVrr) taught in the referenced '932 patent that is located in the memory of each processor unit. The AVTT maintains "permissions" information as to what other elements of the system 10 may send messages, such as processor memory read and write operations, to that processor unit. A message containing a request for a memory read operation for instance, from an element having such permission will be responded to by processing the memory read operation and providing the requested data from the processor unit's memory. A message from an element not having such permission will be responded to with a NACK. When a processor unit 12 halts (by a detected software fault) the memory location of the AVRT will be changed, in effect revoking all permissions. Thereafter, all messages sent to that processor unit will be responded to with a NACK— resulting in initiation of the Regroup operation. If a processor unit 12 halts due to a detected hardware error, the AVTT is not moved, but the processor unit will not respond to any subsequently received messages—in which case path probe messages to this halted processor unit will timeout, causing a Regroup operation to be initiated.

Thus, the sender of a path probe message knows that it can expect (1) an ACK if the recipient processor unit 12 is operating properly and a communication path exists between the sender and receiver, or (2) a NACK if the recipient processor unit has experienced a software halt, or (3) a timeout if the recipient processor unit has experienced certain hardware errors preventing it from returning a response to the message or if that particular communication path between the sender processor unit and the recipient processor unit is lost. Since path probe messages involve much less overhead than what is normally involved in an I'mAlive transmission, and checking them are the responsibility of the sender processor unit, they are much more efficient than prior I'mAlive implementations.

The present invention allows the Hold I/O action to be minimized. Prior fault-tolerant implementations of the I'mAlive protocol using the Regroup method would conservatively see the processor units taking at least two I'mAlive check periods before initiating a Regroup operation in response to absence of an I'mAlive message from one of the processor units. Further, all processor units entering Regroup were required to enter a Hold I/O state, and the stage 1 of Regroup (see referenced Patent No. 5,884,018) would not be left until it was certain that all processor units had entered the Hold I/O state. This was something on the order of 2.7 seconds. With Regroup now being triggered by the path probe messages, this time can be reduced to approximately 0.6 seconds.

FIG. 3 illustrates the latest time that a Regroup operation can start after a processor unit halts due to a detected software fault. As FIG. 3 shows, if the processor unit is halted at time T0, when the software fault is detected a "cooldown" period occurs before the AVT table is moved. Thus, the latest Regroup is entered, after detection of a fault, is the interval between sending path probe messages ("TProbe" in FIG. 3) plus the cool-down period. FIG. 3 shows a processor unit 12 halting at time T0 and a path probe message (Probe$_2$) being sent to the halted processor just before the cool-down period ends. The next path probe message (Probe$_3$) is sent T$_{probe}$ seconds later, resulting in invalid permissions due to movement of the AVTT, and a NACK of the path probe message which will initiate a Regroup operation.

In the case of a hardware detected error causing the processor unit to halt, or a loss of communication paths to the processor unit, the maximum time taken to initiate a Regroup operation is a path probe period, T$_{probe}$, since there is no cool-down period.

Preferably, path probe messages are sent every T$_{tick}$ time period. (Thus, in FIG. 3, T$_{probe}$ is equal to the T$_{tick}$ time period.) This allows the stall period of stage 1 of Regroup to be shortened to T$_{probe}$ +T$_{tick}$ or approximately 0.6 seconds. This is a significant improvement over the prior stall period of 2*T$_{check\ Ttick}$ or approximately 2.7 seconds.

The embodiment of the invention discussed above uses a Regroup operation in which all processor units entering the Regroup operation invoke a Hold I/O state (step 36, FIG. 2). In a further embodiment of the invention illustrated in FIG. 4, the Regroup operation will have the Hold I/O state invoked by only those processor units that are going to halt or enter a cautious mode Regroup. This allows surviving processor units to continue with I/O operations, and never invoking Hold I/O in "false alarm" cases such as when an I'mAlive message is missed because a processor unit is involved in other, higher priority work when an I'mAlive message is due to be sent, and therefore delayed.

This further embodiment extends Stage 1 of the Regroup operation a sufficient time to permit a determination of whether or not there are processor units that will halt. However, as indicated above, this stall need not be longer than T$_{probe}$ +T$_{tick}$ +T$_{stagel}$. T$_{stagel}$ is the time spent before an isolated processor unit will decide to enter cautious mode; this will be approximately three T$_{tick}$ intervals (i.e., approximately 0.9 seconds).

Figure 4:
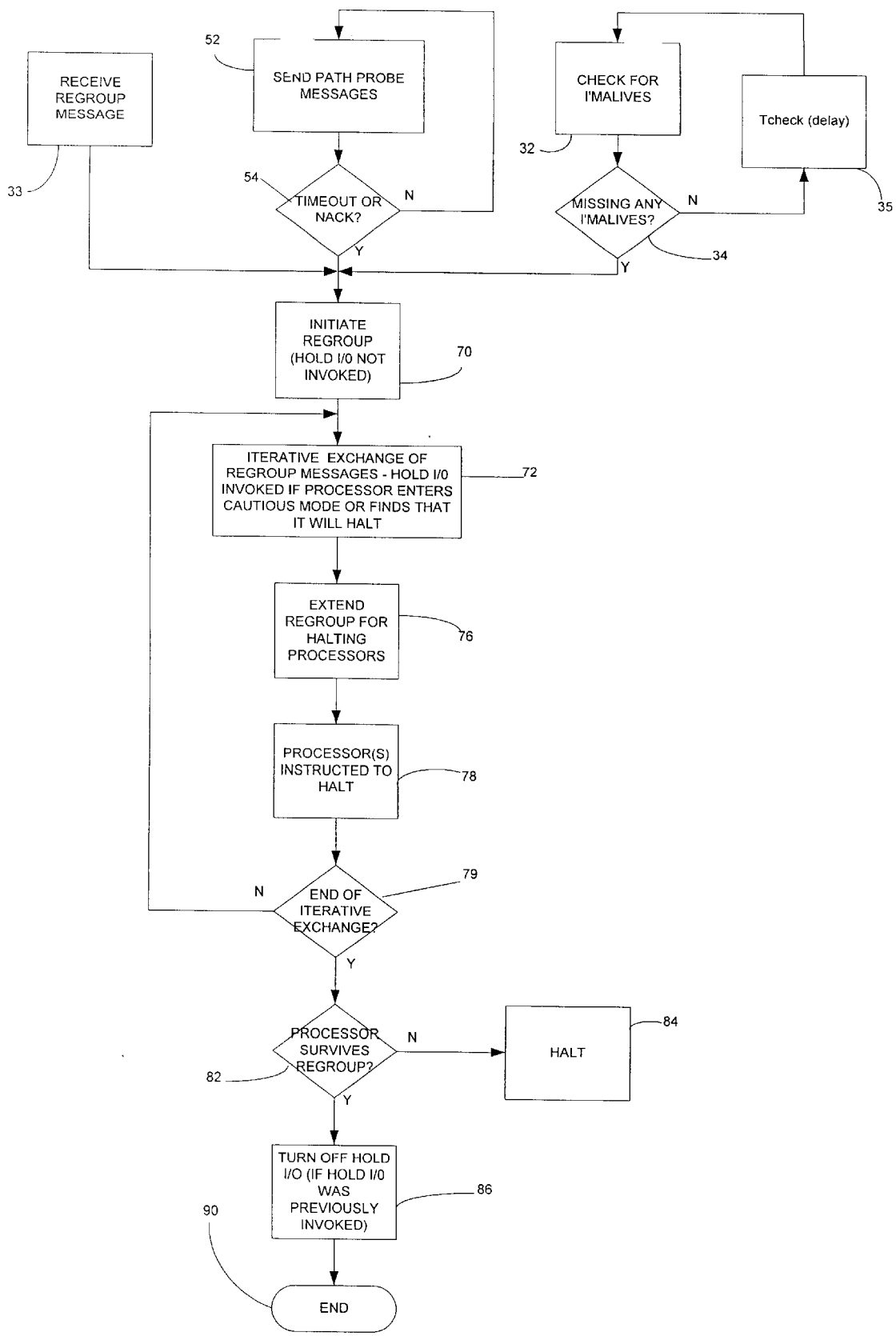
FIG. 4 is a flow diagram illustrating an alternate embodiment of the present invention.

As FIG. 4 shows, entry into the Regroup operation remains the same, i.e., by detecting a missing I'mAlive message (steps 32, 34, 35), or by lack of an appropriate response to a transmitted path probe message (steps 52, 54), or by receiving a Regroup message sent by a processor that has entered the Regroup operation (step 33). However entered, the processors will initiate the Regroup operation at step 70 in the same manner as described above, except that the Hold I/O state will not be invoked at this time. Step 72 has the processor(s) entering Regroup engaging in an iterative exchange of Regroup messages. Those processor units that enter the cautious mode (described above), or that find they will halt, invoke the Hold I/O state. Step 76 extends the Regroup operation to provide additional time for permitting the processor units to determine which are to halt and which will continue. Those processor units 12 determined by the Regroup operation as needing to halt are instructed to halt in step 78.

The iterative exchange of messages will last a predetermined number of rounds; the total duration of the iterative exchange must be sufficiently long to accommodate any time extensions added to the Regroup operation at step 76. If the iterative exchange is to continue, step 79 will return the procedure to step 72. Ultimately, however, it will be determined that the iteration process should end, and step 79 is excited in favor of step 82, where those processors that are to halt will halt (step 84), and those processors that will not halt will go on to step 86. At step 86, those surviving processors that may have turned on Hold I/O (because they entered cautious mode) will turn off Hold I/O, and the procedure will be exited at step 90.

What is claimed is:

1. In a multiprocessor system having a plurality of processor units, a method for distributively agreeing on processor unit membership in said multi-processor system, the method including the steps:

communicatively coupling said plurality of processors units to form, between each of the plurality of processor units and each other of the processor units, at least one communication path;

each of the plurality of processor units periodically sending to each of the other of the plurality of processor units a path probe message on every available communication path communicatively coupling such processor units;

the other of the plurality of processors responding to receipt of the path probe message by returning an acknowledgment;

a first one of the plurality of processors detecting a communications failure by failing to receive the acknowledgment from a second one another of the plurality of processors within a predetermined period of time to initiate a Regroup operation to attempt to determine on each of said plurality of processors still operating which of said plurality of processors are still operating and still communicatively coupled;

the plurality of processors holding input/output operations substantially upon the initiation of the Regroup operation;

secondly determining on said each processor still operating whether said each processor still operating is to continue operations or to halt operations;

maintaining the hold of input/output operations on each said processor to halt operations and releasing the hold of input/output operations on each said processor to continue operations.

2. The method of claim 1, wherein the path probe messages are sent by each of the plurality of processors with a periodicity of substantially $T_{probe}$ and the initiating step including the step of sending Regroup messages with a periodicity of substantially $T_{tick}$, and the holding step includes holding the input/output operations for at least a period substantially equal to $T_{probe}+T_{tick}$.

3. The method of claim 1, including the steps of:

the other of the plurality of processors responding to receipt of the path probe message by returning an acknowledgment or a negative acknowledgment;

a first one of the plurality of processors detecting a communications failure by failing to receive the acknowledgment from the second one another of the plurality of processors within the predetermined period of time or by receiving the negative acknowledgment.

4. The method of claim 1, wherein:

the step of sending the path probe message further comprises sending a request for a processor memory operation by each of the plurality of processor units to each of the other of the plurality of processor units; and the step of responding to receipt of the path probe message by returning an acknowledgment further comprises processing the processor memory operation by the other of the plurality of processors.

5. The method of claim 1 further comprising:

each processor unit:

having an interrupt priority hierarchy;

periodically receiving a first interrupt having a first priority;

periodically sending an I'mAlive message to each of the other of the processor units in response to the first interrupt;

periodically receiving a second interrupt having a second priority, the second priority being higher than the first priority in the interrupt priority hierarchy; and sending the path probe messages to each of the other of the processor units in response to the second interrupt.

6. The method of claim 5, further comprising:

each processor unit:

receiving the first interrupt after each timeout of a first repeating time interval; and receiving the second interrupt after each timeout of a second repeating time interval, the second repeating time interval being shorter than the first repeating time interval.

7. In a processing system including a plurality of processor units coupled to one another by one or more communication paths, a method of determining communicative access of each of the plurality of processor units with each other that includes the steps of each of the processor units (i) sending a path probe message to each of the other plurality of processor units and waiting a predetermined period of time for receipt of an acknowledgment of the path probe message;

(ii) initiating a Regroup operation if no acknowledgment is received back from a one of the other processor units within a predetermined time to determine which processor units are communicatively coupled to one another.

8. The method of claim 7, including the step of providing each of the processors units with at least two communication paths to each of the other of the processor units.

9. The method of claim 8, wherein the sending step includes sending a path probe message on each of the communication paths to such other processor units.

10. The method of claim 9, wherein the initiating step includes initiating a Regroup operation if a negative acknowledgment message is received on one of the communication paths.

11. The method of claim 9, wherein the initiating step includes initiating a Regroup operation if a negative acknowledgment message is received on one of the two communication paths connecting the processor unit to one of the other of the processor units.

12. The method of claim 11, including the processor unit periodically sending to all other processor units an I'mAlive message indicative of continuing fault-free operation of the processor unit; the initiating step including the step of initiating the Regroup operation if a one of the plurality of processor units fails to receive the I'mAlive message from another of the plurality of processor units.

13. The method of claim 9, wherein the initiating step includes initiating a Regroup operation if an acknowledgment message is not received on at least one of the communication paths connecting the processor unit to one of the other of the processor units, within a prescribed timeout limit after path probe messages were sent.

14. The method of claim 7, wherein:
the step of sending the path probe message further comprises sending a request for a processor memory operation to each of the other of the plurality of processor units; and
the acknowledgment of the path probe message further comprises a processing of the processor memory operation.

15. The method of claim 7, further comprising:
each of the processor units:
having an interrupt priority hierarchy;
periodically receiving a first interrupt having a first priority;
periodically sending an I'mAlive message to each of the other of the processor units in response to the first interrupt;
periodically receiving a second interrupt having a second priority, the second priority being higher than the first priority in the interrupt priority hierarchy; and
sending the path probe messages to each of the other of the processor units in response to the second interrupt.

16. The method of claim 15, further comprising:
each of the processor units:
receiving the first interrupt after each timeout of a first repeating time interval; and
receiving the second interrupt after each timeout of a second repeating time interval, the second repeating time interval being shorter than the first repeating time interval.

17. The method of claim 7, wherein each processor unit is capable of invoking a hold I/O state in which all I/O operations, except I/O operations for the Regroup operation, are suspended, further comprising:
each of the processor units:
after initiating the Regroup operation, determining whether the processor unit will halt operations or has entered a cautious mode;
invoking the hold I/O state only after determining that the processor unit will halt operations or has entered the cautious mode.

18. An article of manufacture comprising a computer memory wherein is located a computer program for causing a multiprocessor system having a plurality of processor units communicatively coupled, each of said plurality of processor units having a respective memory, to tolerate interprocessor communications faults by
each of the processor units
(i) periodically sending a path probe message to each of the other plurality of processor units and waiting a predetermined period of time for receipt of an acknowledgment of the path probe message; and
(ii) failing to receive the acknowledgment back within a predetermined time to initiate a Regroup operation to determine which processor units are communicatively coupled to one another.

19. The article of manufacture of claim 18, wherein each of the processors units is provided with at least two communication paths to each of the other of the processor units.

20. The article of manufacture of claim 19, wherein the computer program further causes the multiprocessor system to tolerate interprocessor communications faults by:
each of the processor units:
sending the path probe message on each of the communication paths to each of the other processor units.

21. The article of manufacture of claim 20, wherein the computer program further causes the multiprocessor system to tolerate interprocessor communications faults by:
each of the processor units:
initiating the Regroup operation if a negative acknowledgment message is received on one of the communication paths.

22. The article of manufacture of claim 21, wherein the computer program further causes the multiprocessor system to tolerate interprocessor communications faults by:
each of the processor units:
initiating the Regroup operation if an acknowledgment message is not received on at least one of the communication paths connecting the processor unit to one of the other of the processor units, within a prescribed timeout limit after the path probe messages were sent.

23. The article of manufacture of claim 21, wherein the computer program further causes the multiprocessor system to tolerate interprocessor communications faults by:
each of the processor units:
periodically sending to all other processor units an I'mAlive message indicative of continuing fault-free operation of the processor unit; and initiating the Regroup operation if the processor unit fails to receive the I'mAlive message from another of the plurality of processor units.

24. The article of manufacture of claim 18, wherein:
the path probe message comprises a request for a processor memory operation directed to the memory of each of the processor units; and
the acknowledgment comprises processing the processor memory operation by the other of the plurality of processor units.

25. The article of manufacture of claim 18, wherein each of the processor units has an interrupt priority hierarchy, and the computer program further causes the multiprocessor system to tolerate interprocessor communications faults by:
each of the processor units:
periodically responding to a first interrupt having a first priority by sending an I'mAlive message to each of the other of the processor units; and
periodically responding to a second interrupt having a second priority by sending the path probe messages to each of the other of the processor units, the second priority being higher than the first priority in the interrupt priority hierarchy.

26. The article of manufacture of claim 25, wherein the computer program further causes the multiprocessor system to tolerate interprocessor communications faults by:
each of the processor units:
setting the first interrupt to occur after each timeout of a first repeating time interval; and setting the second interrupt to occur after each timeout of a second repeating time interval, the second repeating time interval being shorter than the first repeating time interval.

27. The article of manufacture of claim 18, wherein each processor unit is capable of invoking a hold I/O state in which all I/O operations, except I/O operations for the Regroup operation, are suspended, and the computer program further causes the multiprocessor system to tolerate interprocessor communications faults by:

each of the processor units:
   initiating the Regroup operation;
   determining whether the processor unit will halt operations or has entered a cautious mode;
   invoking the hold I/O state only after determining that the processor unit will halt operations or has entered the cautious mode.

28. A computer system comprising:

a communications network;

a plurality of processors, communicatively connected by means of said network to provide at least two communication paths between each of the plurality of processors, each of the plurality of processors having a respective memory wherein is located a computer program for causing the computer system to tolerate inter-processor communications faults by detecting a communications failure by
   (i) each one of the plurality of processors periodically sending a path probe message to each of the other ones of the plurality of processors on all communication paths;
   (ii) waiting a predetermined period of time for receipt of an acknowledgment of the path probe message;
   (iii) determining which processors are communicably coupled to one another if a predetermined acknowledgment to the path probe is not received back within a predetermined time.

29. The computer system of claim 28, wherein the determining step of the computer program includes the step of determining which processors are communicably coupled to one another if a predetermined acknowledgment to the path probe is not received back within a predetermined time or a negative acknowledgment is received.

30. The computer system of claims 28, wherein:

the path probe message comprises a request for a processor memory operation directed to the memory of each of the processor; and the acknowledgment comprises processing the processor memory operation by the other of the plurality of processors.

31. The computer system of claim 28, wherein each of the processors has an interrupt priority hierarchy, and the computer program further causes the computer system to detect a communications failure by:

each of the processors:
   periodically responding to a first interrupt having a first priority by sending an I'mAlive message to each of the other of the processors; and
   periodically responding to a second interrupt having a second priority by sending the path probe messages to each of the other of the processors, the second priority being higher than the first priority in the interrupt priority hierarchy.

32. The computer system of claim 31, wherein the computer program further causes the computer system to detect a communications failure by:

each of the processors:
   setting the first interrupt to occur after each timeout of a first repeating time interval; and
   setting the second interrupt to occur after each timeout of a second repeating time interval, the second repeating time interval being shorter than the first repeating time interval.

33. The computer system of claim 28, wherein each processor is capable of invoking a hold I/O state in which all I/O operations, except I/O operations for the aforementioned determining step, are suspended, and the computer program further causes the computer system to detect a communications failure by:

each of the processors:
   determining whether the processor will halt operations or has entered a cautious mode; and
   invoking the hold I/O state only after determining that the processor will shalt operations or has entered the cautious mode.

34. A method for checking communicative connectivity between multiple processors having an interrupt priority hierarchy, comprising:

each processor:
   receiving a first interrupt having a first priority;
   sending an I'mAlive message to each other processor in response to the first interrupt;
   determining whether I'mAlive messages have been received from each other processor within a first predetermined time period;
   receiving a second interrupt having a second priority, the second priority being higher than the first priority in the interrupt priority hierarchy;
   sending a path probe message to each other processor in response to the second interrupt;
   responding to path probe messages received from each other processor,
   determining whether a predetermined response has been received from each other processor within a second predetermined time period; and
   initiating a Regroup operation upon determining that I'mAlive messages have not been received from each other processor within the first predetermined time period or determining that the predetermined response has not been received from each other processor within the second predetermined time period.

35. The method of claim 34, further comprising:

each processor:
   receiving the first interrupt after each timeout of a first repeating time interval; and
   receiving the second interrupt after each timeout of a second repeating time interval, the second repeating time interval being shorter than the first repeating time interval.

36. The method of claim 34, wherein each processor is capable of invoking a hold I/O state in which all I/O operations, except I/O operations for the Regroup operation, are suspended, further comprising:

each processor:
   determining whether the processor will halt operations or has entered a cautious mode; and
   invoking the hold I/O state only after determining that the processor will halt operations or has entered the cautious mode.

37. The method of claim 34, wherein:

the step of sending the path probe message further comprises sending a request for a processor memory operation to each other processor; and the predetermined response to each path probe message further comprises a processing of the processor memory operation by each other processor.

38. A method for checking communicative connectivity between multiple processors capable of invoking a hold I/O state in which all I/O operations, except predetermined I/O operations, are suspended, comprising:

each processor:
sending I'mAlive messages to each other processor;
sending path probe messages to each other processor;
responding to path probe messages from each other processor;
initiating a Regroup operation upon not receiving from any one of the other processors the I'mAlive message or a predetermined response to the path probe message sent thereto;
during the Regroup operation, determining whether the processor will halt operations or has entered a cautious mode; and
only after determining that the processor will halt operations or has entered the cautious mode, invoking the hold I/O state to suspend all I/O operations, except the predetermined I/O operations, the predetermined I/O operations being, I/O operations for the Regroup operation.

39. The method of claim 38, wherein:

the step of sending the path probe messages further comprises sending requests for a processor memory operation to each other processor; and the predetermined response to each path probe message further comprises a processing of the processor memory operation by each other processor.

* * * * *